BEST AVAILABLE COPY

T858004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 41

620,869

SUEDE FABRIC AND METHOD OF MAKING SAME

Richard L. Bradbury, Wilmington, Del., assignor to E. I. du Pont de Nemours and Company, Wilmington, Del., a corporation of Delaware Filed Mar. 6, 1967. Published Jan. 7, 1969
Class 161—64
1 Sheet Drawing. 8 Pages Specification

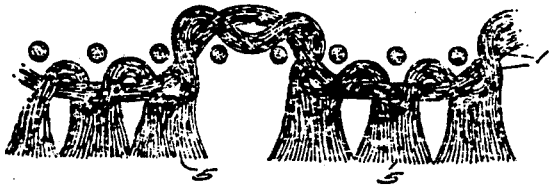

A napped suede-like fabric is prepared from woven elastic core-spun filling yarns having a continuous filament spandex core and a sheath of staple fibers. Shrinkage of the core yarn causes loops of sheath fibers to protrude from the fabric surface. The loops are napped to produce the suede fabric. The method of making the suede fabric includes the steps of (1) weaving a fabric having in the gray state widely-spaced warp yarns and closely packed filling yarns, which filling yarns are composed of a core and a sheath disposed around said core, said core composed of at least one continuous elongated elastic fiber, (2) scouring the fabric to produce contraction of the filling yarn and concomitantly causing the said sheath to form loops disposed around the said core, (3) napping and tucking one side of the scoured fabric causing a breaking of a substantial portion of the fibers forming the said loops of sheath which are exposed to form a dense pile of entangled fibers and resulting in a nonstretch fabric.

United States Patent Office

PTO - BOYERS, PA Duty Station

MISSING PAGE TEMPORARY NOTICE

PATENT # T858004 FOR ISSUE DATE 1-07-1969

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheet 1

N/A at Boyers
6/1/94

Data Conversion Operation

Boyers, Pa